United States Patent
Hsu et al.

(10) Patent No.: US 9,536,484 B2
(45) Date of Patent: Jan. 3, 2017

(54) LIQUID CRYSTAL ARRAY SUBSTRATE AND ELECTRONIC DEVICE

(71) Applicant: SHENZHEN CHINA STAR OPTOELECTRONICS TECHNOLOGY CO., LTD., Shenzhen, Guangdong (CN)

(72) Inventors: Je Hao Hsu, Guangdong (CN); Jingfeng Xue, Guangdong (CN); Xiaohui Yao, Guangdong (CN)

(73) Assignee: SHENZHEN CHINA STAR OPTOELECTRONICS TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 13/983,778

(22) PCT Filed: Jun. 30, 2013

(86) PCT No.: PCT/CN2013/078536
§ 371 (c)(1),
(2) Date: Aug. 6, 2013

(87) PCT Pub. No.: WO2014/201724
PCT Pub. Date: Dec. 24, 2014

(65) Prior Publication Data
US 2016/0093259 A1    Mar. 31, 2016

(30) Foreign Application Priority Data

Jun. 21, 2013 (CN) .......................... 2013 1 0250730

(51) Int. Cl.
*G02F 1/1368* (2006.01)
*G02F 1/1362* (2006.01)
*G09G 3/36* (2006.01)

(52) U.S. Cl.
CPC ........... *G09G 3/3648* (2013.01); *G02F 1/1368* (2013.01); *G02F 1/136213* (2013.01); *G02F 1/136286* (2013.01); *G09G 3/3607* (2013.01); *G09G 3/3659* (2013.01); *G09G 2300/0452* (2013.01); *G09G 2320/0242* (2013.01)

(58) Field of Classification Search
CPC ............... G02F 1/136286; G02F 1/134363; G02F 1/136213; G02F 1/13624; G02F 1/134309; G02F 1/133753; G02F 1/134336; G02F 1/1323; G02F 1/1368; G02F 2001/133757; G02F 2001/134345; G09G 3/3614; G09G 3/3648; G09G 3/3659; G09G 3/3655; G09G 3/3413; G09G 3/36; G09G 3/3426; G09G 3/3611; G09G 3/003; G09G 3/2003; G09G 3/2022; G09G 3/3233; G09G 3/3607; G09G 2300/0426; G09G 2300/0443; G09G 2300/0809; G09G 2300/0447; G09G 2300/0876; G09G 2300/0814; G09G 2300/0465; G09G 2300/0452; G09G 2310/0235; G09G 2310/0262; G09G 2320/028; G09G 2320/0252; G09G 2320/0646; G09G 2320/0247; G09G 2320/0673; G09G 2320/0209; G09G 2320/0223; G09G 2340/0407; G09G 2340/06; G09G 2360/144; G09G 5/06; G09G 5/393; H04N 13/0422; H01L 2251/5323
See application file for complete search history.

(56) References Cited

U.S. PATENT DOCUMENTS

| | | | | |
|---|---|---|---|---|
| 2008/0030636 A1* | 2/2008 | Huang | ............ | G02F 1/136213 349/38 |
| 2012/0320099 A1* | 12/2012 | Wu | ............ | G09G 3/3659 345/690 |
| 2013/0100108 A1* | 4/2013 | Chiang | ............ | G09G 3/3659 345/212 |

* cited by examiner

*Primary Examiner* — Nalini Mummalaneni

(57) ABSTRACT

A liquid crystal array substrate includes a number of pixels, each pixel includes a main region, a first sub-region, and a second sub-region. The main region includes a first thin film transistor (TFT), the first sub-region comprises a second TFT, and the second sub-region comprises a third TFT. Gates of the first TFT, the second TFT, and the third TFT of each pixel are connected to a first scan line, a source of the first TFT is connected to a first data line, a drain of the first TFT is connected to one corresponding pixel electrode; sources of the second TFT and the third TFT are connected to a second data line, drains of the second TFT and the third TFT are respectively connected to corresponding pixel electrodes.

8 Claims, 3 Drawing Sheets

US 9,536,484 B2

LIQUID CRYSTAL ARRAY SUBSTRATE AND ELECTRONIC DEVICE

TECHNICAL FIELD OF THE INVENTION

The present invention relates to substrates, and more particularly, to a liquid crystal array substrate and an electronic device with the same.

BACKGROUND OF THE INVENTION

Nowadays, liquid crystal electronic device, such as liquid crystal display (LCD) and LCD television are more popular. A common liquid crystal electronic device usual has a multi-angle display mode. In the multi-angle display mode, because liquid crystal molecules are pointed to different directions when viewing at different viewing angles, which causes a color distortion when viewing at a large viewing angle. Usually, in order to improve the color distortion, one pixel of the liquid crystal molecule is divided to two parts when designing pixel of the liquid crystal molecules, one part is a main region, and the other is a sub-region. The color distortion is improved by controlling the voltage of the two regions. Therein, the design of dividing the pixel to the main region and the sub-region is referred to as a low color shift (LCS) design. However, the improvement of the design by dividing the pixel into the two parts is limited.

SUMMARY OF THE INVENTION

The present invention provides a liquid crystal array substrate and an electronic device, which capable of improving color distortion problem when being viewed at a large viewing angle.

A liquid crystal array substrate comprising a plurality of pixels arranged in array mode, each pixel comprises a main region, a first sub-region, and a second sub-region; wherein, the main region comprises a first thin film transistor (TFT), the first sub-region comprises a second TFT, and the second sub-region comprises a third TFT; gates of the first TFT, the second TFT, and the third TFT of each pixel are connected to a first scan line, a source of the first TFT is connected to a first data line, a drain of the first TFT is connected to one corresponding pixel electrode; sources of the second TFT and the third TFT are connected to a second data line, drains of the second TFT and the third TFT are respectively connected to corresponding pixel electrodes; wherein, each pixel further comprises a fourth TFT, a gate of the fourth TFT is connected to a second scan line, a source of the fourth TFT is coupled to the drain of the second TFT, and a drain of the fourth TFT is electrically connected to the drain of the third TFT.

The first scan line is used to produce an on signal or an off signal to control the first TFT, the second TFT, and the third TFT to turn on or off accordingly; the first data line is configured to input a first data driving signal to the main region when the first TFT is turned on; the second data line is configured to input a second data driving signal to the first sub-region and the second sub-region when the second TFT and the third TFT are turned on, wherein, the first data driving signal is different from the second data driving signal.

The first data line inputs the first data driving signal to the main region is: inputs the first data driving signal to the pixel electrode connected to the first TFT of the pixel.

The second data line inputs the second data driving signal to the first sub-region and the second sub-region is: inputs the second data driving signal to the pixel electrodes connected to the second TFT and the third TFT of the pixel.

The main region, the first sub-region, and the third region of the pixel both comprises a liquid crystal capacitor and a storage capacitor, the liquid crystal capacitor is formed by one corresponding pixel electrode, a common electrode, and a liquid crystal layer located between the pixel electrode and the common electrode; the storage capacitor is formed by one corresponding pixel electrode, a storage electrode, and a dielectric layer located between the pixel electrode and the storage electrode; the common electrode is connected to a first common voltage terminal, the storage electrode is connected to a second common voltage terminal.

The first sub-region further comprises a first sharing capacitor and a second sharing capacitor; the first sharing capacitor and the second sharing capacitor are connected between the drain of the second TFT and ground in series; the source of the fourth TFT is connected to a connection node of the first sharing capacitor and the second sharing capacitor and then is coupled to the drain of the second TFT via the first sharing capacitor.

An electronic device comprising a liquid crystal array substrate, the liquid crystal array substrate comprises a plurality of pixels arranged in array mode, each pixel comprises a main region, a first sub-region, and a second sub-region; wherein, the main region comprises a first thin film transistor (TFT), the first sub-region comprises a second TFT, and the second sub-region comprises a third TFT; gates of the first TFT, the second TFT, and the third TFT of each pixel are connected to a first scan line, a source of the first TFT is connected to a first data line, a drain of the first TFT is connected to one corresponding pixel electrode; sources of the second TFT and the third TFT are connected to a second data line, drains of the second TFT and the third TFT are respectively connected to corresponding pixel electrodes; wherein, each pixel further comprises a fourth TFT, a gate of the fourth TFT is connected to a second scan line, a source of the fourth TFT is coupled to the drain of the second TFT, and a drain of the fourth TFT is electrically connected to the drain of the third TFT.

The first scan line is used to produce an on signal or an off signal to control the first TFT, the second TFT, and the third TFT to turn on or off accordingly; the first data line is configured to input a first data driving signal to the main region when the first TFT is turned on; the second data line is configured to input a second data driving signal to the first sub-region and the second sub-region when the second TFT and the third TFT are turned on, wherein, the first data driving signal is different from the second data driving signal.

The first data line inputs the first data driving signal to the main region is: inputs the first data driving signal to the pixel electrode connected to the first TFT of the pixel.

The second data line inputs the second data driving signal to the first sub-region and the second sub-region is: inputs the second data driving signal to the pixel electrodes connected to the second TFT and the third TFT of the pixel.

The main region, the first sub-region, and the third region of the pixel both comprises a liquid crystal capacitor and a storage capacitor, the liquid crystal capacitor is formed by one corresponding pixel electrode, a common electrode, and a liquid crystal layer located between the pixel electrode and the common electrode; the storage capacitor is formed by one corresponding pixel electrode, a storage electrode, and a dielectric layer located between the pixel electrode and the storage electrode; the common electrode is connected to a first common voltage terminal, the storage electrode is connected to a second common voltage terminal.

The first sub-region further comprises a first sharing capacitor and a second sharing capacitor; the first sharing capacitor and the second sharing capacitor are connected between the drain of the second TFT and ground in series; the source of the fourth TFT is connected to a connection node of the first sharing capacitor and the second sharing capacitor and then is coupled to the drain of the second TFT via the first sharing capacitor.

The liquid crystal array substrate and an electronic device capable of improving color distortion problem when being viewed at a large viewing angle.

DETAILED DESCRIPTION OF THE PREFERRED EMBODIMENTS

Figure 1:
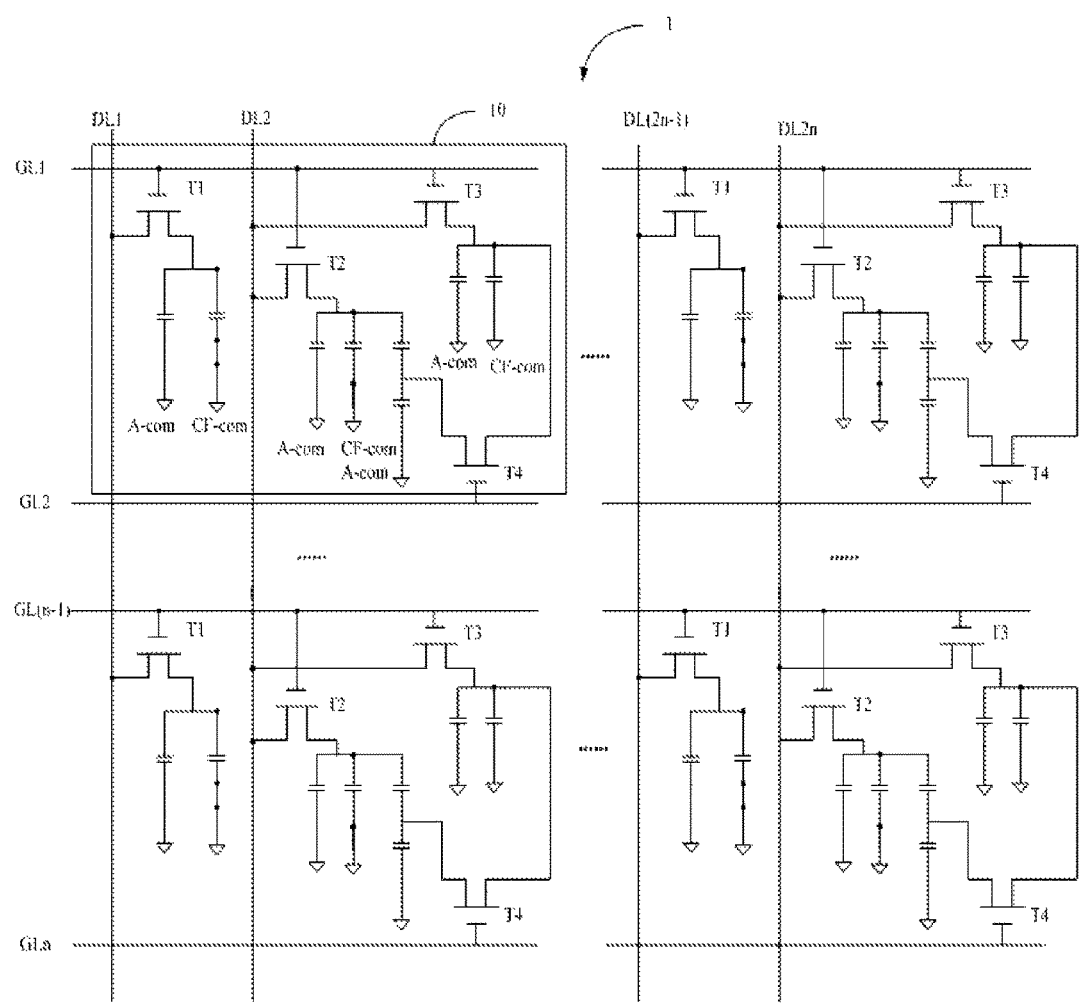
FIG. 1 is a schematic diagram of a liquid crystal array substrate of an embodiment.
Figure 2:
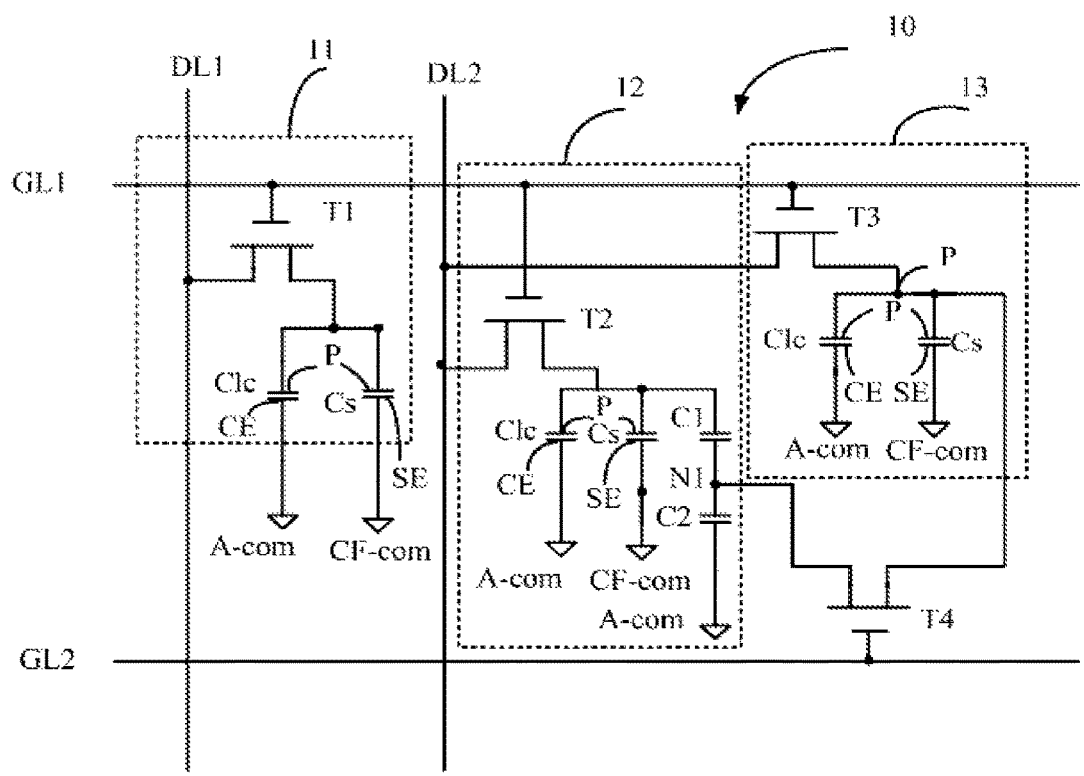
FIG. 2 is an equivalent circuit diagram of a pixel of a liquid crystal array substrate of an embodiment.

Referring to FIGS. 1 and 2 together, FIG. 1 is a schematic diagram of a liquid crystal array substrate 1, FIG. 2 is an equivalent circuit diagram of a pixel 10 of the liquid crystal array substrate 1. The liquid crystal array substrate 1 includes a number of pixel 10 arranged in array mode. Each pixel 10 includes a main region 11, a first sub-region 12, and a second sub-region 13. The main region 11 includes a first thin film transistor (TFT) T1. The first sub-region 12 includes a second TFT T2. The second sub-region 12 includes a third TFT T3.

In the embodiment, the pixels 10 of each column are connected to two data line. In detail, the main regions 11 of the pixels 10 of each column are connected to one data line, the first sub-regions 12 and the second sub-regions 13 of the pixels 10 of each column are connected to another data line. For example, as shown in FIG. 1, the main regions 11 of the pixels of a first column are connected to a data line DL1, the first sub-regions 12 and the second sub-regions 13 of the pixel 10 of the first column are connected to a data line DL2; the main regions 11 of the pixels of the Nth column are connected to a data line DL(2n−1), and the first sub-regions 12 and the second sub-regions 13 of the pixel 10 of the Nth column are connected to a data line DL2n.

The main regions 11, the first sub-regions 12, and the second sub-regions 13 of the pixels 10 of each row are all connected to a scan line. For example, the main regions 11, the first sub-regions 12, and the second sub-regions 13 of the pixels of a first row are connected to a scan line GL1; the main regions 11, the first sub-regions 12, and the second sub-regions 13 of the pixels of a row (N−1) are connected to a scan line GL(n−1); and the main regions 11, the first sub-regions 12, and the second sub-regions 13 of the pixels of the Nth row are connected to a scan line GLn.

In detail, the pixel 10 of the first row and the first column is taken as example to illustrate a structure of the pixel 10 of the present invention.

As shown in FIG. 2, gates of the first TFT T1, the second TFT T2, and the third TFT T3 are connected to the scan line GL1. A source of the first TFT T1 is connected to the data line DL1, a drain of the first TFT T1 is connected to one corresponding pixel electrode P. Sources of the second TFT T2 and the third TFT T3 are connected to the data line DL2, drains of the second TFT T2 and the third TFT T3 are respectively connected to a corresponding pixel electrode P.

The scan line GL1 is used to produce an on signal or an off signal to control the first TFT T1, the second TFT T2, and the third TFT T3 to turn on or off accordingly. The data line DL1 is used to input a first data driving signal to the main region 11 when the first TFT T1 is turned on. The data line DL2 is used to input a second data driving signal to the first sub-regions 12, and the second sub-regions 13 when the second TFT T2 and the third TFT T3 are turned on.

Therefore, in the present invention, the data driving signal received by the first TFT T1 of the main region 11 is different from the data driving signals received by the second TFT T2 and the third TFT T3. Then, a driving voltage applied to the first main region 11 is different from a driving voltage applied to the first sub-region 12 and the second sub-region 13, which causing the display of the main region 11 is different from the display of the first sub-region 12 and the second sub-region 13. Thus reducing color distortion.

In detail, the drains of the first TFT T1, the second TFT T2, and the third TFT T3 are respectively connected to corresponding pixel electrodes P. The data line DL1 inputs the first data driving signal to the main region 11 is: inputs the first data driving signal to the pixel electrode P connected to the first TFT T1 of the pixel 10. The data line DL2 inputs the second data driving signal to the first sub-region 11 and the second sub-region 12 is: inputs the second data driving signal to the pixel electrodes P connected to the second TFT T2 and the third TFT T3 of the pixel 10. Therefore, the pixel electrode P connected to the first TFT T1 obtains the first data driving signal, the pixel electrodes P connected to the second TFT T2 and the third TFT T3 obtains the second data driving signal. The first data driving signal is different the second data driving signal. As is well known, the voltage of the pixel electrode P is different, a rotate angle of liquid crystal molecules is driven to different, thus making the display of the corresponding regions are different. Namely, the display of the main region 11 is different from the display of the first sub-region 12 and the second sub-region 13, thus reducing color distortion.

As shown in FIG. 2, the pixel 10 also includes a fourth TFT T4, a gate of the fourth TFT T4 is connected to the scan line GL2, a source of the fourth TFT T4 is coupled to the drain of the second TFT T2, a drain of the fourth TFT T4 is electrically connected to the drain of the third TFT T3.

As shown in FIG. 2, the main region 11, the first sub-region 12, and the third region 13 of the pixel 10 both includes a liquid crystal capacitor Clc and a storage capacitor Cs. Each liquid crystal capacitor Clc is formed by a corresponding pixel electrode P, a common electrode CE, and a liquid crystal layer (not labeled) located between the pixel electrode P and the common electrode CE. Each storage capacitor Cs is formed by a corresponding pixel electrode P, a storage electrode SE, and a dielectric layer (not labeled) located between the pixel electrode P and the storage electrode SE.

In the embodiment, the common electrode CE is connected to a first common voltage terminal (array common voltage terminal) A-com, the storage electrode SE is connected to a second common voltage terminal (color film common voltage terminal) CF-com. In another embodiment, the common electrode CE and the storage electrode SE are connected to the same common electrode voltage terminal.

Therein, the first common voltage terminal A-com and the second common voltage terminal CF-com both have zero voltage.

The first sub-region 12 also includes a first sharing capacitor C1 and a second sharing capacitor C2. The first sharing capacitor C1 and the second sharing capacitor C2 are connected between the drain of the second TFT T2 and ground in series. The source of the fourth TFT T4 is connected to a connection node N1 of the first sharing capacitor C1 and the second sharing capacitor C2. The source of the fourth TFT T4 is coupled to the drain of the second TFT T2 via the first sharing capacitor C1, the source of the fourth TFT T4 is also coupled the first common voltage terminal A-com via the second sharing capacitor C2.

As described above, the pixel 10 of the liquid crystal array substrate 1 are arranged in array mode. The first TFTs T1, the second TFTs T2, and the third TFTs T3 of the pixels of one row are connected to one scan line. These scan lines GL1-GLn control the first TFTs T1, the second TFTs T2, and the third TFTs T3 of the pixels 10 of each row to turn on in sequence. When the first scan line SL1 controls the first TFTs T1, the second TFTs T2, and the third TFTs T3 of the pixels of one row to turn on, as described above, the data driving signal received by the first TFT T1 is different from the data driving signal received by the second TFT T2 and the third TFT T3. Thus making the display of the main region 12 is different from the display of the first sub-region 12 and the second sub-region 13.

When the second scan line GL2 controls the pixel 10 of the correspond row (the second row) to turn on, the fourth TFTs T4 of the pixels 10 of the previous row (the first row) is turned on too. Because the first TFTs T1, the second TFTs T2, and the third TFTs T3 of the pixels 10 of the previous row are turned off now, the storage capacitor Cs of the main region 11, the first sub-region 12, and the second sub-region 13 are discharged to the corresponding pixel electrode P. At the same time, the first sharing capacitor C1 and the second sharing capacitor C2 are discharged to the drain of the second TFT T2, the first sharing capacitor C1 and the second sharing capacitor C2 are also discharged to the drain of the third TFT T3 via the fourth TFT T4 which is turned on. When the first sharing capacitor C1 and the second sharing capacitor C2 are discharged to the drain of the third TFT T3, almost only the second sharing capacitor C2 is discharged to the drain of the third TFT T3 in fact. Thus, the discharge to the drain of the third TFT T3 and the drain of the TFT T2 is unbalanced and causes the voltage of the drain of the second TFT T2 is different from the voltage of the drain of the third TFT T3. Namely, the voltage applied to the pixel electrode P connected to the second TFT T2 is different from the voltage applied to the pixel electrode P connected to the third TFT T3. Thus, the display of the first sub-region 12 is different from the display of the second sub-region 13. Because the main region 10 only be discharged via the storage capacitor Cs, then the voltages of the drains of the first TFT T1, the second TFT T2, and the third TFT T3 are different each other. Thus improving the color distortion viewed at the large viewing angle more better.

Figure 3:
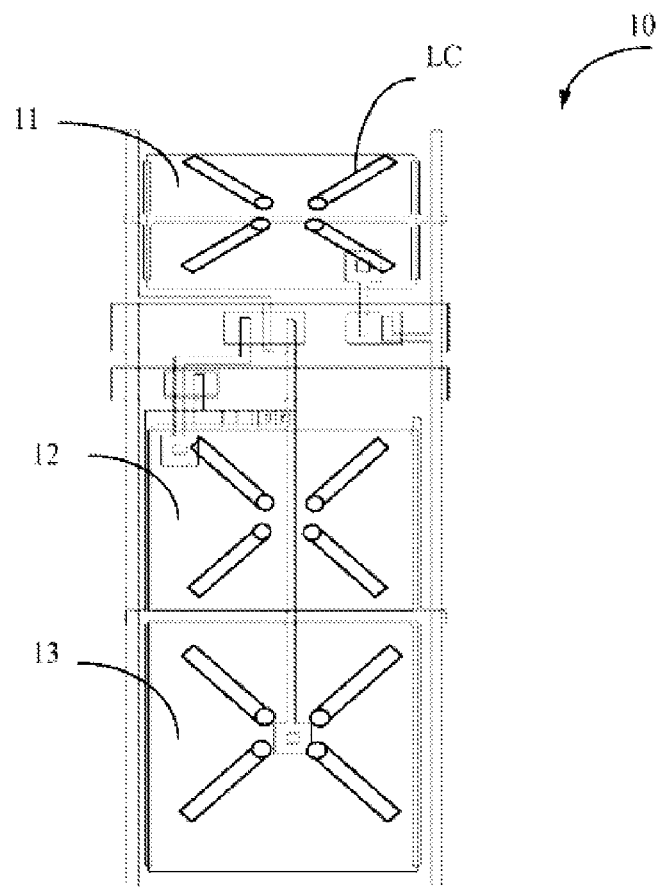
FIG. 3 is a schematic diagram showing a structure of a pixel of a liquid crystal array substrate of an embodiment.

Referring to FIG. 3, in the detail structure, through dividing a pixel 10 to the main region 11, the first sub-region 12, and the second sub-region 13, and through a design of each pixel 10 connecting to one scan line and two data line, and the capacitors and the fourth TFT T4, liquid crystal molecules LC of the main region 11, the first sub-region 12, and the second sub-region 13 all are capable of rotating four directions as shown in FIG. 3. Then, the liquid crystal molecules LC of one pixel 10 can rotate 4*3=12 directions. Thus improving the color distortion viewed at the large viewing angle.

Figure 4:
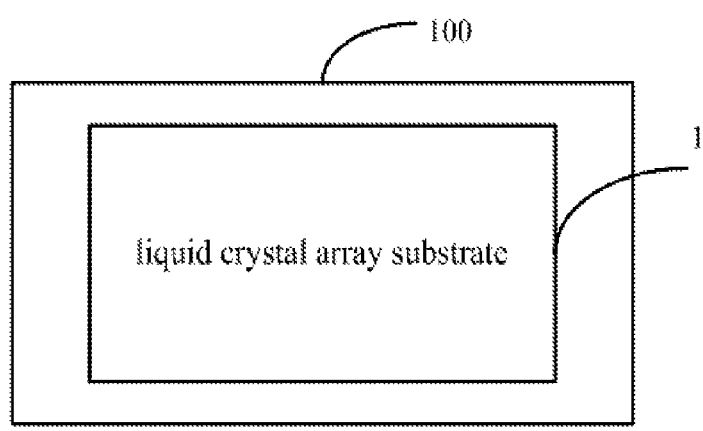
FIG. 4 is a schematic diagram of an electronic device with a liquid crystal array substrate of an embodiment.

Referring to FIG. 4, an electronic device 100 includes the liquid crystal array substrate 1 is illustrated. The electronic device 100 includes the liquid crystal array substrate 1 and other necessary elements. The electronic device 100 can be a LCD or a LCD television.

The present invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A liquid crystal array substrate, comprising a plurality of pixels arranged in array mode, each pixel comprises a main region, a first sub-region, and a second sub-region; wherein, the main region comprises a first thin film transistor (TFT), the first sub-region comprises a second TFT, and the second sub-region comprises a third TFT; gates of the first TFT, the second TFT, and the third TFT of each pixel are connected to a first scan line, a source of the first TFT is connected to a first data line, a drain of the first TFT is connected to one corresponding pixel electrode; sources of the second TFT and the third TFT are connected to a second data line, drains of the second TFT and the third TFT are respectively connected to corresponding pixel electrodes; wherein, each pixel further comprises a fourth TFT, a gate of the fourth TFT is connected to a second scan line, a source of the fourth TFT is coupled to the drain of the second TFT, and a drain of the fourth TFT is electrically connected to the drain of the third TFT, wherein the main region, the first sub-region, and the third region of the pixel both comprises a liquid crystal capacitor and a storage capacitor, the liquid crystal capacitor is formed by one corresponding pixel electrode, a common electrode, and a liquid crystal layer located between the pixel electrode and the common electrode; the storage capacitor is formed by one corresponding pixel electrode, a storage electrode, and a dielectric layer located between the pixel electrode and the storage electrode; the common electrode is connected to a first common voltage terminal, the storage electrode is connected to a second common voltage terminal, wherein the first sub-region further comprises a first sharing capacitor and a second sharing capacitor; the first sharing capacitor and the second sharing capacitor are connected between the drain of the second TFT and ground in series; the source of the fourth TFT is connected to a connection node of the first sharing capacitor and the second sharing capacitor and then is coupled to the drain of the second TFT via the first sharing capacitor.

2. The liquid crystal array substrate of claim 1, wherein the first scan line is used to produce an on signal or an off signal to control the first TFT, the second TFT, and the third TFT to turn on or off accordingly; the first data line is configured to input a first data driving signal to the main region when the first TFT is turned on; the second data line is configured to input a second data driving signal to the first sub-region and the second sub-region when the second TFT and the third TFT are turned on, wherein, the first data driving signal is different from the second data driving signal.

3. The liquid crystal array substrate of claim 2, wherein the first data line inputs the first data driving signal to the main region is: inputs the first data driving signal to the pixel electrode connected to the first TFT of the pixel.

4. The liquid crystal array substrate of claim 3, wherein the second data line inputs the second data driving signal to the first sub-region and the second sub-region is: inputs the second data driving signal to the pixel electrodes connected to the second TFT and the third TFT of the pixel.

5. An electronic device, comprising a liquid crystal array substrate, the liquid crystal array substrate comprises a plurality of pixels arranged in array mode, each pixel comprises a main region, a first sub-region, and a second sub-region; wherein, the main region comprises a first thin film transistor (TFT), the first sub-region comprises a second TFT, and the second sub-region comprises a third TFT; gates of the first TFT, the second TFT, and the third TFT of each pixel are connected to a first scan line, a source of the first TFT is connected to a first data line, a drain of the first TFT is connected to one corresponding pixel electrode; sources of the second TFT and the third TFT are connected to a second data line, drains of the second TFT and the third TFT are respectively connected to corresponding pixel electrodes; wherein, each pixel further comprises a fourth TFT, a gate of the fourth TFT is connected to a second scan line, a source of the fourth TFT is coupled to the drain of the second TFT, and a drain of the fourth TFT is electrically connected to the drain of the third TFT, wherein the main region, the first sub-region, and the third region of the pixel both comprises a liquid crystal capacitor and a storage capacitor, the liquid crystal capacitor is formed by one corresponding pixel electrode, a common electrode, and a liquid crystal layer located between the pixel electrode and the common electrode; the storage capacitor is formed by one corresponding pixel electrode, a storage electrode, and a dielectric layer located between the pixel electrode and the storage electrode: the common electrode is connected to a first common voltage terminal, the storage electrode is connected to a second common voltage terminal, wherein the first sub-region further comprises a first sharing capacitor and a second sharing capacitor; the first sharing capacitor and the second sharing capacitor are connected between the drain of the second TFT and ground in series; the source of the fourth TFT is connected to a connection node of the first sharing capacitor and the second sharing capacitor and then is coupled to the drain of the second TFT via the first sharing capacitor.

6. The electronic device of claim 5, wherein the first scan line is used to produce an on signal or an off signal to control the first TFT, the second TFT, and the third TFT to turn on or off accordingly: the first data line is configured to input a first data driving signal to the main region when the first TFT is turned on; the second data line is configured to input a second data driving signal to the first sub-region and the second sub-region when the second TFT and the third TFT are turned on, wherein, the first data driving signal is different from the second data driving signal.

7. The electronic device of claim 6, wherein the first data line inputs the first data driving signal to the main region is: inputs the first data driving signal to the pixel electrode connected to the first TFT of the pixel.

8. The electronic device of claim 7, wherein the second data line inputs the second data driving signal to the first sub-region and the second sub-region is: inputs the second data driving signal to the pixel electrodes connected to the second TFT and the third TFT of the pixel.

* * * * *